United States Patent [19]

Bilezikjian

[11] Patent Number: 5,522,640
[45] Date of Patent: Jun. 4, 1996

[54] APPARATUS FOR AN ENERGY DISSIPATING SEAT LEG

[75] Inventor: Vahe Bilezikjian, Denton, Tex.

[73] Assignee: Weber Aircraft, Inc., Gainesville, Tex.

[21] Appl. No.: 349,486

[22] Filed: Dec. 2, 1994

[51] Int. Cl.⁶ .................................................. B60N 2/42
[52] U.S. Cl. ............................. 297/216.2; 297/216.17; 297/216.1; 296/68.1; 188/377
[58] Field of Search ................. 296/68.1; 188/377; 293/133; 297/216.20, 216.17, 472, 232

[56] References Cited

U.S. PATENT DOCUMENTS

| | | | |
|---|---|---|---|
| 3,603,638 | 9/1971 | McGregor et al. | 297/216.1 X |
| 4,229,040 | 10/1980 | Howell et al. | 297/355 X |
| 4,375,300 | 3/1983 | Long et al. | 297/232 X |
| 4,440,441 | 4/1984 | Marrujo et al. . | |
| 4,718,719 | 1/1988 | Brennan | 297/216.1 |
| 4,861,103 | 8/1989 | Vallee . | |
| 4,900,084 | 2/1990 | Forster et al. . | |
| 4,911,381 | 3/1990 | Cannon et al. | 297/216.1 |
| 5,069,505 | 12/1991 | Amthor et al. | 297/216.1 |
| 5,224,755 | 7/1993 | Beroth | 297/216.1 |
| 5,282,665 | 2/1994 | Beroth | 297/216.1 |

*Primary Examiner*—Peter M. Cuomo
*Assistant Examiner*—Stephen Vu
*Attorney, Agent, or Firm*—Crutsinger & Booth

[57] ABSTRACT

A saddle assembly for securing an aircraft seat to a seat leg assembly wherein the seat leg assembly has a pair of elongated openings and a chamber formed therein. A compression tube extends through the chamber formed in the seat leg such that opposite ends of the tube extend outwardly to be engaged by a pair of slide blocks mounted on opposite sides of the leg. A saddle, having spaced legs, supports the pair of slide blocks adjacent end portions of the compression tube such that an upward force on the saddle moves the slide blocks into engagement with opposite ends of the compression tube for dissipating energy.

23 Claims, 5 Drawing Sheets

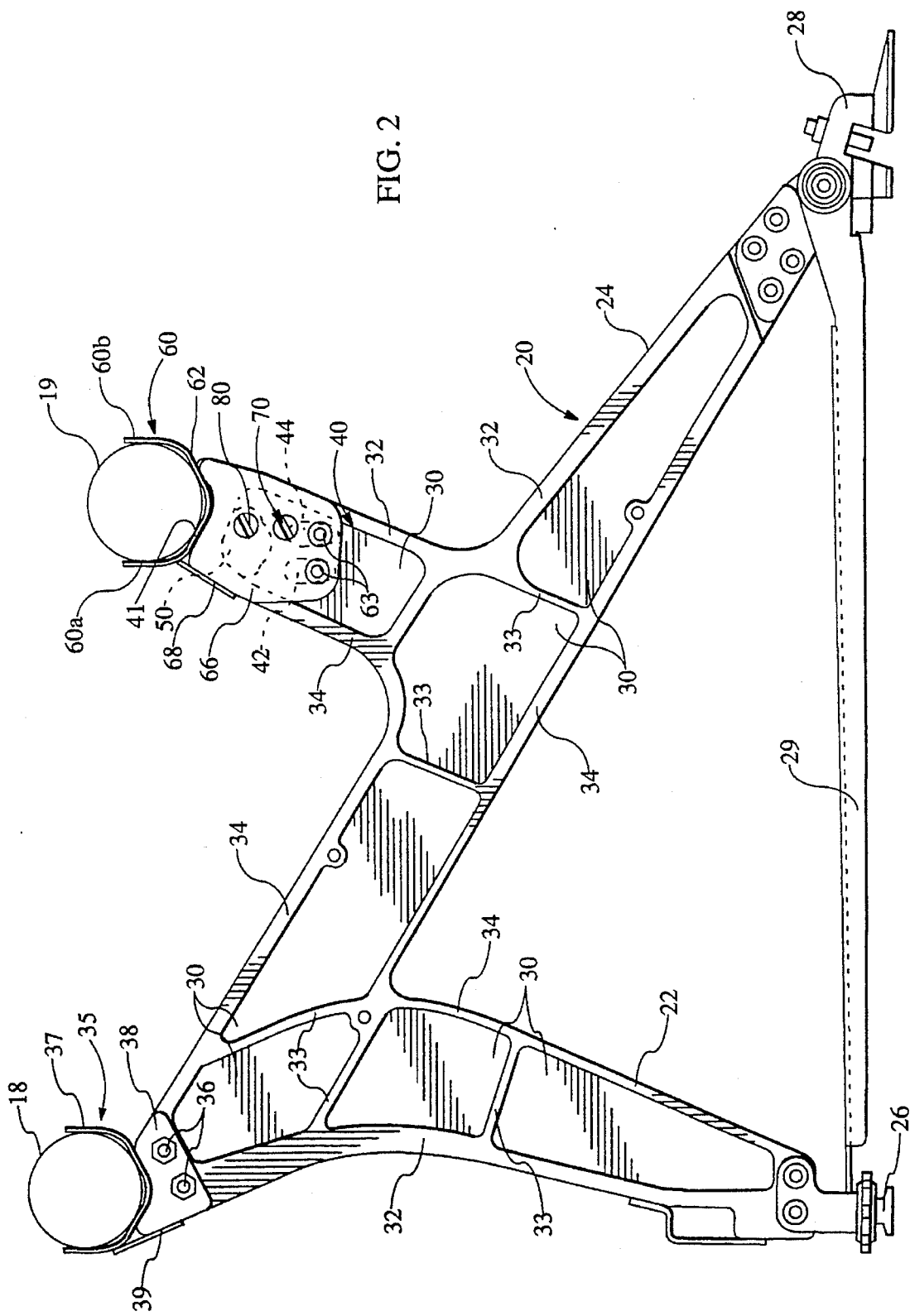

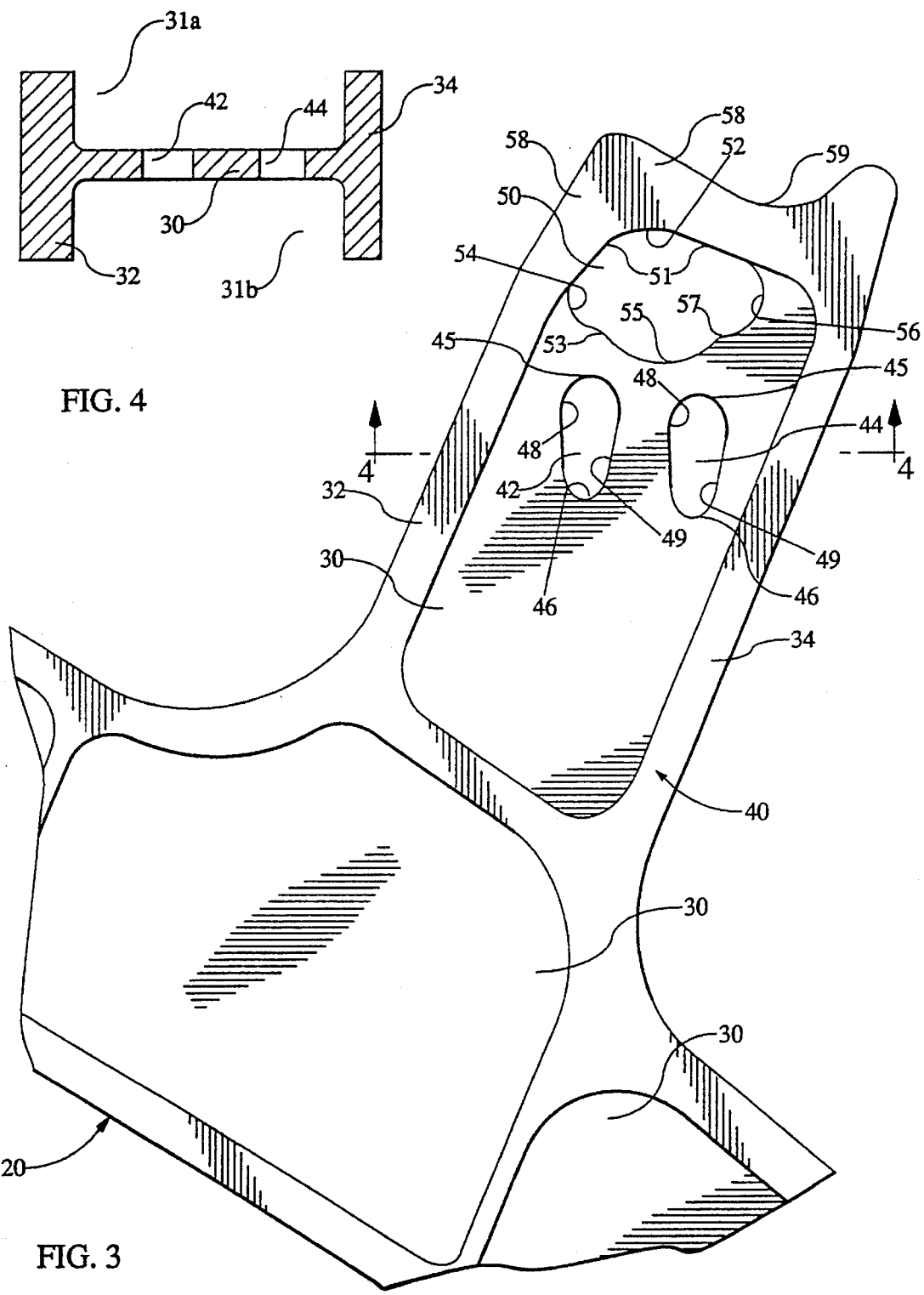

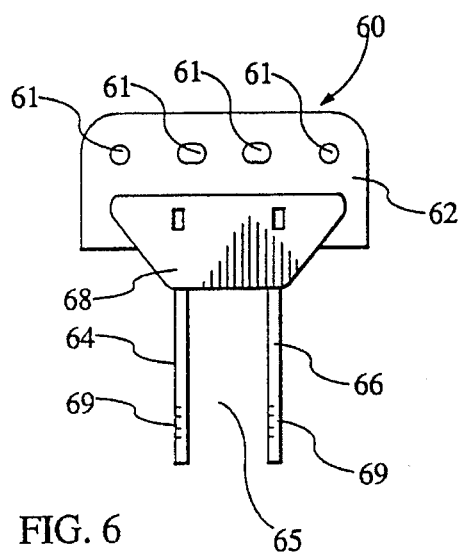
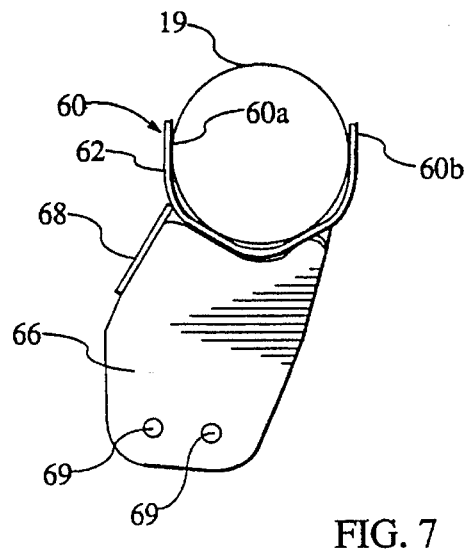
FIG. 6  FIG. 7
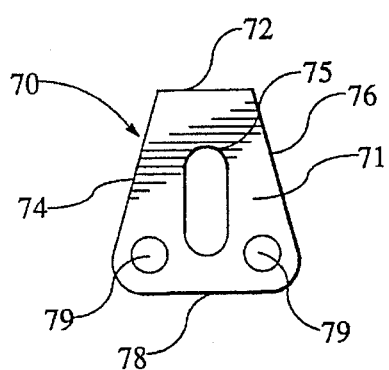
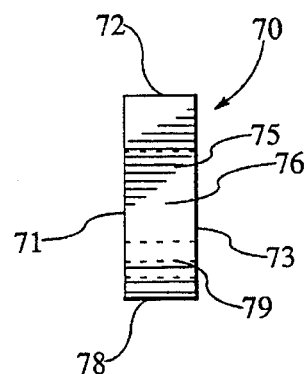
FIG. 8  FIG. 9
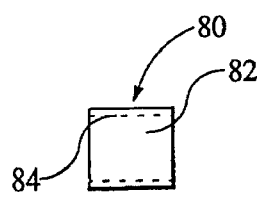
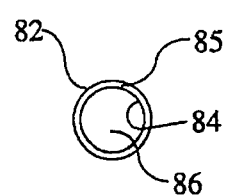
FIG. 10  FIG. 11

APPARATUS FOR AN ENERGY DISSIPATING SEAT LEG

TECHNICAL FIELD

The invention relates to a leg for a vehicle seat. More specifically, the invention relates to an energy dissipating vehicle seat leg for dissipating energy from a vehicle crash to aid in sustaining continuity between the vehicle seat and the floor of the vehicle and limit injury to vehicle occupants.

BACKGROUND OF THE INVENTION

Seat support structures for vehicle seats must be lightweight and yet be sturdy to support the vehicle seat and its occupant during normal usage. Furthermore, seat support structures must also disperse extraordinary loads brought on by violent or abrupt maneuvering of the vehicle in the event of an accident or crash.

Aircraft seats must accommodate both a need for structural integrity and a need for minimum weight. Fuel consumption is partially a function of the weight of the aircraft. Therefore, aircraft seats are made as light as possible while still maintaining structural integrity. Generally, unitary seat frames are made of solid metal with carefully engineered voids and areas of reduced thickness to decrease weight while maintaining structural integrity. However, these seat members are resistant to bending and tend to shear or fracture on impact. This result is undesirable because broken members could injure passengers. Furthermore, broken seat members could puncture or otherwise degrade the integrity of fire-retardant barriers on the seats and impede evacuation of the aircraft.

Aviation safety standards generally require different g-load tolerances for an aircraft seat and the aircraft floor track to which the seat is mounted through a track fitting. For example, an aircraft seat must generally accommodate a 16 g-load whereas the tracks must generally accommodate a 9 g-load. Therefore, a crash generating greater than 9 g-loads will tend to separate the aircraft seat from its tracks. This is a highly undesirable result because dislodged seats could cause greater injury to the passengers. The letter "g" refers to one gravitational unit which equals 9.8 meters per second per second or 32.2 feet per second per second. Therefore, a 16 g-load equals sixteen gravitational forces.

Energy dissipating seat members dissipate energy as they are crushed in a controlled manner on impact. The dissipation of energy increases the passenger's likelihood of surviving an impact because a reduced impact force is transferred to the passenger. Further, the energy dissipation averts the tendency of the seat leg assemblies to shear.

Prior art discloses such energy dissipating devices. Generally, these devices consist of integral or non-integral formed devices that function on the basis of (1) compression stress activated devices, (2) tensile stress activated devices, or (3) a combination of compression and tensile stress dissipation devices.

U.S. Pat. No. 5,069,505 discloses a non-integrally formed, tensile stress activated energy dissipating system. The patent discloses a bent rear leg that distends when tensile stress is applied. As the rear leg distends, energy is dissipated as frictional heat energy through the body of the leg.

U.S. Pat. No. 4,861,103 discloses a non-integrally formed, compression activated energy dissipating device. The patent discloses a resisting structure for dissipating impact forces. The resisting structure consists of a shock absorber assembly in which a compression force is dissipated when a rod is forced into a block of synthetic plastic. The resisting structure links an aft leg member and a fore leg member. In the event of a crash, the rear and fore legs pivot forward.

U.S. Pat. No. 4,440,441 also discloses a non-integrally formed, compression activated energy dissipation device. The patent discloses a seat assembly with a tooled fore leg predisposed to collapse. When an impact occurs, the forward inertia of the seat causes the fore legs to collapse to the floor.

U.S. Pat. No. 5,224,755 and U.S. Pat. No. 5,282,665 disclose an integrally formed, compression stress activated energy dissipation device. Discussed is a seat leg assembly that utilizes an energy absorbing zone located between the fore seat support and the fore leg. The energy absorbing zone is positioned so that severe downward g-loading on the fore seat support will compress the fore seat support and the fore seat leg together, thereby dissipating energy through the energy absorbing zone.

With regard to the patents discussed above, integrated leg assemblies are favored due to the simplicity of manufacturing and maintenance. Multiple part assemblies require that the individual parts be manufactured and then be assembled into a leg assembly prior to attachment to the seat. This operation is labor intensive. Furthermore, non-integrally formed devices generally have pivot or attachment points which require maintenance and upkeep to ensure that the unit will function properly. Furthermore, non-integral units lack overall rigid strength to accommodate a plurality of varying forces that result from an air crash.

To operate as desired, compression activated devices generally require a unilateral force. However, aircraft crashes generally do not generate a single unilateral force but a plurality of random forces. A torsional force acting on a compression device or a shock absorber compression device would tend to skew the linear downward motion of the assembly, which would negate the controlled energy dissipation scheme of the device. Furthermore, upon activation, compression activated devices tend to cause the seat to encroach on the area defined by the immediately preceding seat. Although the devices may allow the leg assembly to remain secured to the aircraft's floor, the chair's occupant is potentially exposed to secondary injuries not caused by the initial impact.

Another tensile stress dissipating device utilizes a bent leg that distends when a tensile force is exerted on the seat. However, like the compression devices mentioned above, the bent leg devices also tend to encroach into the space of the immediately preceding seat. Furthermore, the device dissipates the impact force through the bent leg as frictional heat, further causing the leg to weaken and potentially fracture. Additionally, severe stress is conveyed to the floor track attachment of the leg device, potentially causing a failure of the floor connection resulting in loss of continuity with the floor track.

SUMMARY OF THE INVENTION

Apparatus disclosed herein dissipates energy caused by a vehicle crash to prevent a vehicle seat from dislodging from its floor mountings. Furthermore, the seat being capable of accommodating 16 g-load and the tracks to which the seat is mounted being capable of accommodating 9 g-load, the apparatus limits that probability of the seat separating from its floor mounting.

The apparatus includes a vehicle seat having a leg assembly connected by track fittings to a floor mounted track. The leg assembly has a fore and aft seat support that is connected to the vehicle seat and a fore and aft seat leg that are connected to a vehicle floor. The seat legs and the seat supports are preferably integrally formed into a unit. The apparatus dissipates energy generated from a vehicle crash that occurs as a tensile force. This tensile force urges the aft seat leg to pull away from the aft seat leg and urges the aft leg to disengage from the vehicle floor.

The energy dissipating apparatus comprises an energy dissipating member that is mounted in the aft seat support of the leg assembly. More specifically, the energy dissipating member is peripherally enclosed and laterally extending through the walls of the aft seat support. A plunger block is secured to the vehicle seat. The plunger block is slidably disposed about the aft seat support of the leg assembly wherein the energy dissipating member is between the plunger and the seat for enabling the plunger to crushingly engage the energy dissipating member in response to the tensile force.

A further aspect of the present invention is that the energy dissipating member comprises a cylindrical tube. The cylindrical tube has a predetermined crush-resisting capacity.

Another aspect of the present invention is that the plunger comprises two blocks opposingly mounted on the aft seat support. Furthermore, each block has a generally trapezoidal shape. The shape focuses energy into the energy dissipating member as the energy dissipating member is crushed. The shape and mounting of the blocks prevents binding to assure that the device functions properly when force is applied at several angles.

BRIEF DESCRIPTION OF THE DRAWINGS

Drawings of a preferred embodiment of the invention are annexed hereto so that the invention may be better and more fully understood, in which:

FIG. 2 is an enlarged elevational view of the leg assembly;

FIG. 3 is an enlarged fragmentary view of a portion of a seat support on the aft leg of the leg assembly;

FIG. 4 is a cross-sectional view taken along line 4—4 of FIG. 3;

FIG. 6 is a front elevational view of a saddle;

FIG. 7 is a side elevational view of the saddle;

FIG. 8 is a front elevational view of a slide block;

FIG. 9 is a side elevational view of the slide block;

FIG. 10 is a front elevational view of a compression tube; and

FIG. 11 is an end view of the compression tube.

Numeral reference are employed to designate like parts throughout the various figures of the drawings.

DESCRIPTION OF A PREFERRED EMBODIMENT

Figure 1:
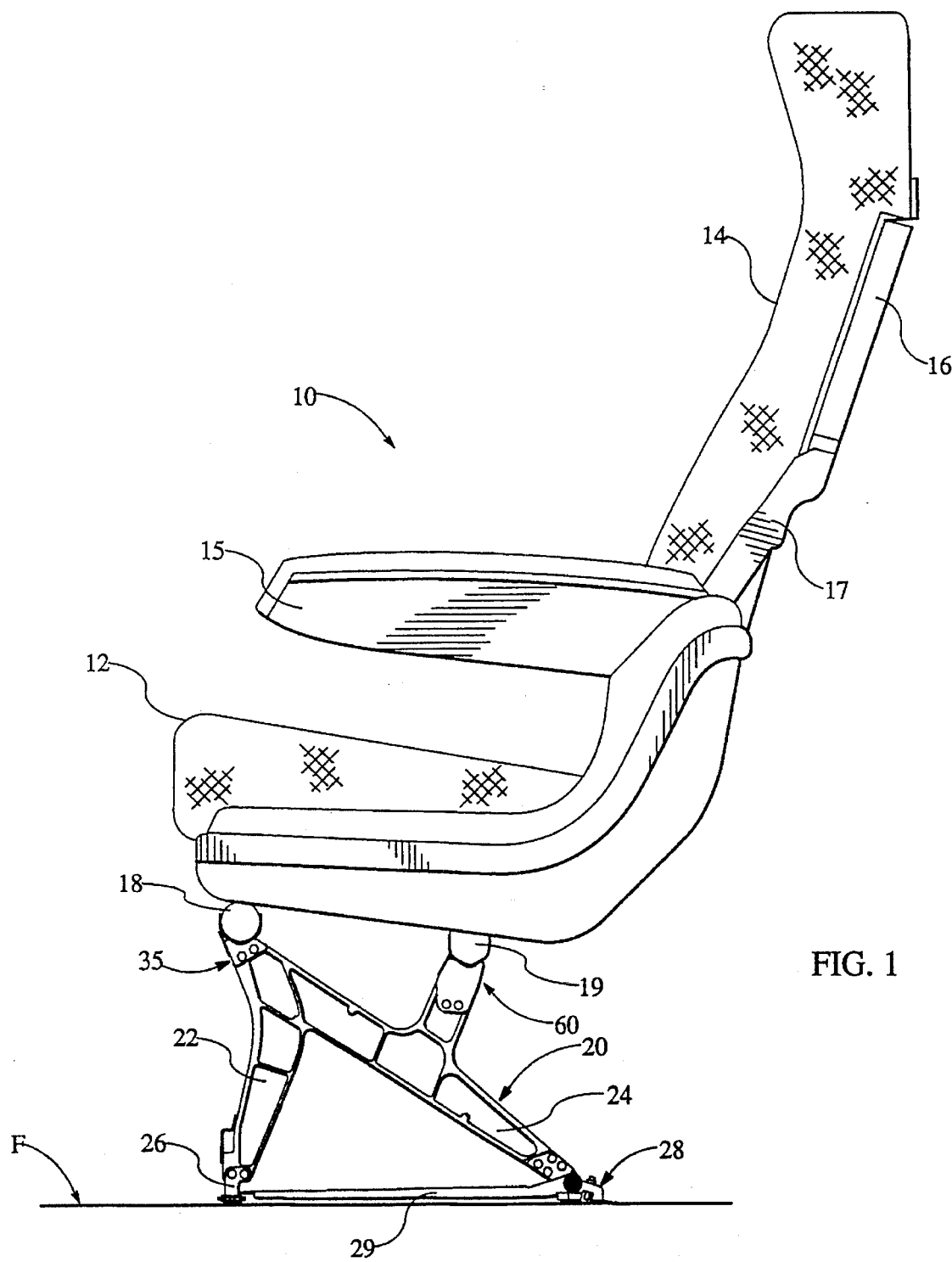
FIG. 1 is a side elevational view of an aircraft seat supported by a leg assembly.

Referring to FIG. 1 of the drawing the numeral 10 generally designates an aircraft passenger seat having a bottom seat cushion 12, a reclining seat back 14, spaced armrests 15 and a seat back tray table 16 mounted on arms 17 pivotally mounted to the seat frame. A base frame is formed by spaced stretcher tubes 18 and 19 joined by spreaders (not shown) which extend along each side of each seat bottom cushion 12. A seat pan (not shown) is mounted on stretcher tubes 18 and 19 and between the spreaders for supporting bottom cushion 12.

The seat hereinbefore described is of conventional design and may assume a variety of configurations, for example as disclosed in Wade et al U.S. Pat. No. 5,352,020; Beroth U.S. Pat. No. 5,224,755 or Arnold et al U.S. Pat. No. 5,178,345.

The seat 10 is supported by a leg assembly, generally designated by the numeral 20 in FIGS. 1–5 of the drawing.

As best illustrated in FIGS. 2–4, the leg assembly 20 has a front or fore leg 22 and a rear or aft leg 24 having track fittings 26 and 28 mounted on the lower end thereof. Track fittings 26 and 28 secure the leg assembly to a track (not shown) mounted on the floor F (FIG. 1) of an aircraft. Tracks and track fittings are disclosed in Bentley U.S. Pat. No. 5,058,829, the disclosure of which is incorporated herein by reference in its entirety. A track cover assembly 29 has opposite ends connected between track fittings 26 and 28.

Fore seat leg 22 and aft seat leg 24 are preferably of unitary construction and in a preferred embodiment are machined from a single piece of aircraft grade aluminum or other strong, light weight material. As illustrated in FIG. 4 of the drawing, the material is machined to form a web 30 bounded by thickened flange portions 32 and 34 such that a cross-section of each leg 22 and 24 resembles an I-beam construction. Struts 33, as best shown in FIG. 2, extend between flanges 32 and 34 to form a strong light-weight structure.

Referring to FIG. 2 a saddle 35 is secured by fasteners 36, such as bolts, machine screws, rivets or other suitable connectors to the upper end of front leg 22 for supporting the stretcher tube 18 that extends below the front of bottom seat cushion 12. Saddle 35 may assume a variety of configurations. However, in the illustrated embodiment the saddle includes a generally U-shaped cradle member 37 having spaced plates 38 secured thereto, plates 38 extending along opposite sides of flanges 32 and 34 and secured to the upper end of front leg 22 by fasteners 36. A front gusset plate 39 is welded or otherwise rigidly secured to U-shaped cradle member 37 and plates 38.

The aft stretcher tube 19 is supported by an aft saddle assembly, generally designated by the numeral 60, on aft seat support 40.

As best illustrated in FIG. 3 of the drawing, the aft seat support 40 has elongated openings 42 and 44 formed in the web portion 30 thereof. Upper ends 45 of elongated openings 42 and 44 are generally semicircular as are lower ends 46. However, as best illustrated in FIG. 3, the upper ends 45 preferably have a larger radius than lower ends 46 such that the cross-sectional area of each of the elongated openings 42 and 44 is upwardly increasing and the sides 48 and 49 of elongated openings 42 and 44 are not parallel. If it is deemed expedient to make sides 48 and 49 parallel, the sides should be spaced apart a distance greater than the diameter of connectors 63, illustrated in Figure 5.

An opening 50 is formed in the upper portion of web 30 of aft seat support 40 and forms a recess or chamber for a compression member, as will be hereinafter more fully explained. Opening 50 has a curved upper surface 52, curved end surfaces 54 and 56 and a curved lower surface 55. Curved transition surfaces 53 and 57 are reverse curves which intersect with curved end surfaces 54 and 56 and lower curved surface 55, as illustrated in FIG. 3 of the drawing. Generally straight upper surfaces 51 tangentially intersect curved upper surface 52 and curved end surfaces 54 and 56 to complete the periphery of opening 50. Thickened flange portions 58 extend above upper surfaces 51 and 52 of opening 50 and are curved to form a cradle shaped upper end 59 on aft seat support 40.

Figure 5:
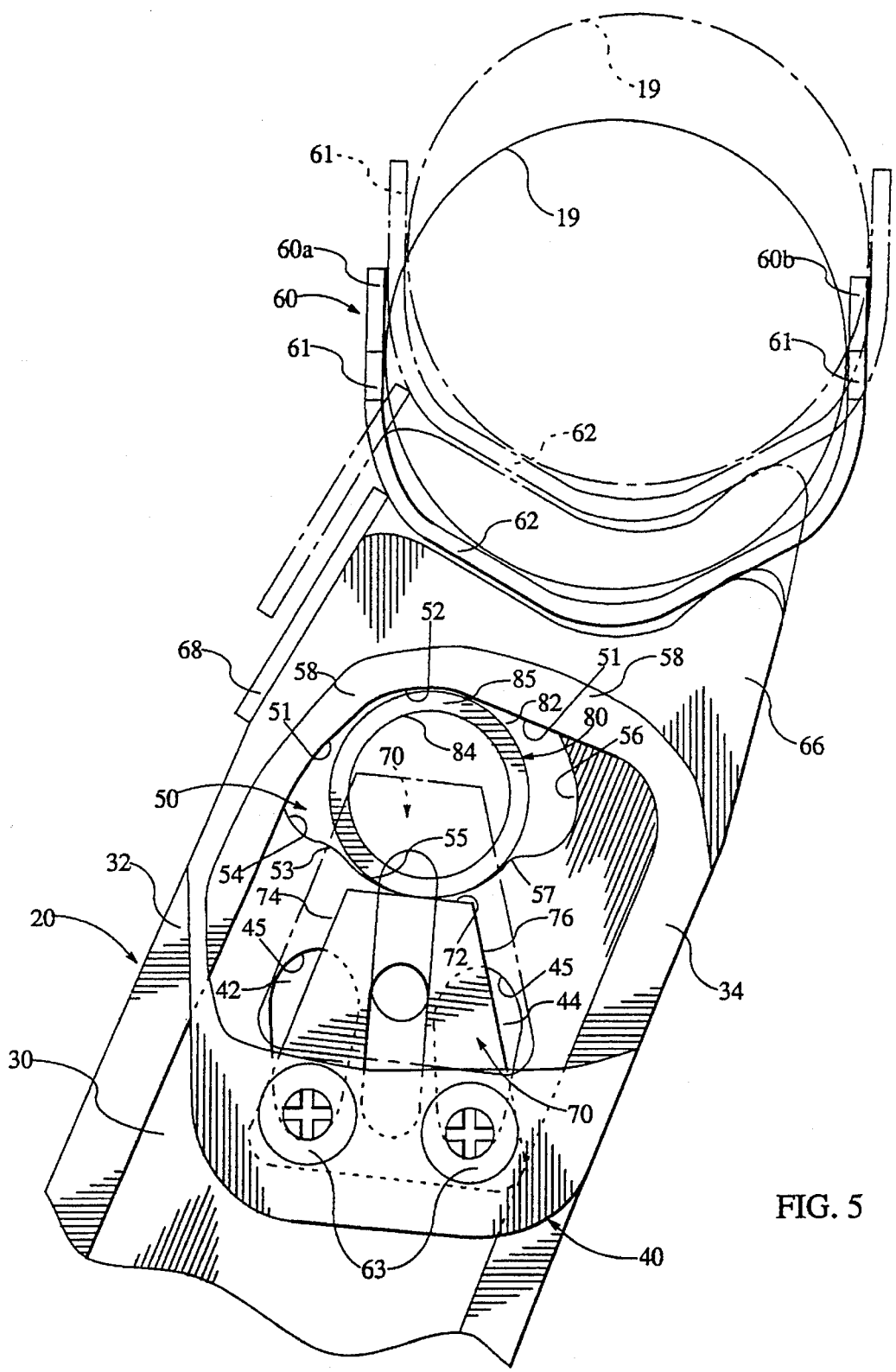
FIG. 5 is an enlarged fragmentary elevational view of a saddle assembly for securing the seat to the aft leg of the leg assembly.

As best illustrated in FIGS. 5, 6 and 7 the aft stretcher support assembly 60 is formed by an elongated generally U-shaped cradle 62 having upwardly extending legs 60a and 60b, through which openings 61 are formed to receive fasteners, such as screws, bolts, rivets or other suitable connectors for securing the aft stretcher 19 to cradle 62. Spaced plates 64 and 66 are welded or otherwise secured to cradle 62 to form a socket 65 therebetween. A gusset plate 68, best illustrated in FIG. 6, is welded to cradle 62 and plates 64 and 66 to form a rigid member suitable for supporting stretcher 19. Apertures 69 are formed in the lower ends of plates 64 and 66 for receiving connectors 63 such as bolts, screws, rivets or pins, as illustrated in FIG. 5, that extend through elongated openings 42 and 44, best illustrated in FIG. 3 in the web portion 30 of the aft seat support 40.

Referring to FIGS. 8 and 9, a slide block forming a plunger, generally designated by the numeral 70 has a top face 72, side surfaces 74 and 76 and a lower surface 78. An elongated cut out portion 75 is formed in a central portion of slide block 70 to reduce the weight of the block. Passages 79 are formed in a lower portion of block 70 to receive connectors 63, as best illustrated in FIG. 5 of the drawing, for mounting a slide block 70, illustrated in FIGS. 5, 8 and 9, in cut out portions 31a and 31b, illustrated in FIG. 4, adjacent opposite sides of web 30 between flanges 32 and 34 of support 40. Slide block 70 has parallel front and rear faces 71 and 73. However, it should be readily apparent that side surfaces 74 and 76 are not parallel and converge toward the top face 72 of slide block 70, generally forming a trapezoidal profile of the slide block 70.

Referring to FIGS. 10 and 11 of the drawing, a compression member, generally designated by the numeral 80, comprises an elongated compression tube having an outer surface 82 and a concentric inner surface 84 adjacent opposite sides of a circular tube wall 85. The interior 86 of the compression tube 80 is hollow.

Referring to FIGS. 3 and 5 of the drawing, compression tube 80, preferably constructed of 4130 steel having an outside diameter of for example about 0.75 inches and a wall thickness of, for example, about 0.065 inches, is positioned such that the upper portion of its outer surface 82 is positioned adjacent the upper surface 52 of opening 50. The lower portion of the outer surface 82 of tube 80 is positioned adjacent the curved lower surface 55 of opening 50. Slide block 70 is positioned, as illustrated in FIG. 5, such that the top face 72 of slide block 70 is adjacent the lower portion of opposite ends of the outer surface 82 of compression tube 80. As noted hereinbefore, a pair of slide blocks 70 are positioned on opposite sides of web 30. The aft stretcher support assembly 60 is positioned such that the upper end of the aft seat support 40 extends between plates 64 and 66 into the socket 65 between the plates. Connectors 63 extend through apertures 69 in plates 64 and 66, through passages 79 in slide blocks 70 and through elongated openings 42 and 44 in the web portion 30 of the aft seat support 40.

From the foregoing it should be readily apparent that a downwardly directed force on the seat is transferred by stretcher tube 19 to the aft stretcher support assembly 60 supported by the aft seat leg 24. However, in the event of a crash landing causing the aircraft to decelerate suddenly, the momentum of the passenger and the seat apply forces tending to rotate the seat leg assembly 20, putting the front track fitting 26 in compression and the aft track fitting 28 in tension.

Floor mounted tracks in aircraft are generally designed to accommodate 9 g-loading. However, the seat leg assembly 20 must accommodate 16 g-loading.

When stretcher tube 19 moves upwardly, plates 64 and 66 on the rear stretcher support assembly 60 tend to move upwardly, applying force through slide blocks 70 to compression tube 80. The upward force, applied by the top faces 72 of slide blocks 70 to opposite ends of compression tube 80, tends to crush the tube. Significant energy is dissipated as tube 80 is deformed by forces exerted between the top faces 72 of slide blocks 70 and the upper surface 52 of opening 50. Compression tube 80 is sized, configured and constructed of material that will dissipate sufficient energy to reduce a 16-g or greater load applied by stretcher tube 19 to less than a 9-g load applied by aft track fitting 28 to the track mounted in the floor F of the aircraft.

The 9-g and 16-g load parameters discussed herein may vary depending on the type of vehicle. For helicopters, automobiles or busses, for example, different g-load parameters maybe used to attenuate impact loading.

The amount of attenuation decreases as the diameter of compression tube 80 increases unless the thickness of wall 85 increases. The material used for construction of compression member 80 also influences the force attenuating characteristics.

Further, while compression member 80 has been described and illustrated as a hollow cylindrical tube, it may assume other and further configurations. For example, member 80 may be replaced with a square or elliptical shaped tube with a wall of varying thickness such that resistance to deformation gradually increases or decreases as force is applied.

Referring to FIGS. 1 and 5 of the drawing, it should be readily apparent that the passenger and seat are supported by stretcher tubes 18 and 19. Stretcher tube 18 extending across the front of the seat is supported by saddle 35 and the stretcher tube 19 extending across the back of the seat is supported by saddle assembly 60. The cradle 37 of saddle 35 is supported by the curved upper end of front leg 22 and is retained in position by fasteners 36.

The rear stretcher tube 19 is supported by cradle 62 seated in the curved cradle shaped upper end 59 of aft seat support 40. Connectors 63 are normally positioned adjacent lower ends 46 of elongated openings 42 and 44, as illustrated at the full outline position in FIG. 5 of the drawing.

When an upwardly directed force is applied by stretcher tube 19 to the aft stretcher support assembly 60, it moves upwardly from the full outline position toward the dashed outline position illustrated in FIG. 5 of the drawing. Force exerted on compression tube 80 by top faces 72 of slide blocks 70 urge the outer surface 82 of compression tube 80 into engagement with the upper surface 52 of opening 50. Further upward movement of slide blocks 70 will deform tube 80 causing tube wall 85 to be deformed outwardly into space adjacent end walls 54 and 56 of opening 50.

Tube 80 is preferably selected such that it will be deformed by application of g-loads in a range between 9 g and 16 g such that any load exceeding 9 g-loading will be dissipated during the deformation of tube 80 such that a load of less than a 9 g-load will be transmitted through aft leg 24 to the aft track fitting 28.

It is important to note that the shape and configuration of slide blocks 70 and elongated openings 42 and 44 permit movement of connectors 63 upwardly through elongated openings 42 and 44 without binding slide blocks 70. The upwardly diverging sides 48 and 49 of elongated openings 42 and 44 provide sufficient slack or free space to assure that connectors 63 are not wedged into a position that would prevent upward movement of saddle assembly 60.

The shape of opening 50 may vary from that illustrated in FIG. 3 of the drawing. However, the illustrated configuration maintains compression tube 80 in a centered position above the top faces 72 of slide blocks 70 and permits deformation of compression tube 80.

Compression tube 80 is captured between plates 64 and 66 in socket 65 to assure that opposite ends of compression tube 80 are maintained in a desired position relative to the top faces 72 of slide blocks 70.

While the energy dissipating characteristics of the saddle assembly hereinbefore described have been directed primarily to preventing disengagement of the rear track fitting 28 from the track, it should be appreciated that the energy absorbing characteristics of the apparatus also reduce loading exerted on the passenger by seat belts reducing the possibility or extent of injury to the passenger.

It should also be readily apparent that the seat leg assembly 20 may assume other and further configurations. While the preferred embodiment illustrated in FIG. 2 of the drawing and hereinbefore described is of unitary, machined construction, the seat leg assembly may assume other and further configurations and may be formed of multiple parts connected together and having the saddle assembly 60 secured thereto.

The terms "up," "down," "left," "right," "upper," "lower," "front," and "rear" as used herein are meant only to refer to relative positions and/or orientations, for convenience, and are not to be understood to be in any manner otherwise limiting.

What I claim is:

1. Apparatus for mounting a vehicle seat having a leg assembly with a fore and aft seat support connected to the vehicle seat and a fore and aft seat leg connected to a vehicle floor, the seat legs and the seat supports integrally formed into a unit such that the apparatus dissipates energy generated from a vehicle crash that forms a tensile force urging the aft seat leg to pull away from and to disengage the aft seat leg from a seat mounting track secured to the vehicle floor, the apparatus comprising:

an energy dissipating member having a central portion peripherally enclosed and laterally extending through an opening in the aft seat support of the leg assembly and having end portions; and a plunger secured to the vehicle seat, said plunger slidably disposed about the aft seat support of the leg assembly wherein said energy dissipating member is between said plunger and the seat for enabling said plunger to crushingly engage end portions of said energy dissipating member in response to the tensile force, thereby limiting tensile force tending to urge the aft seat leg from the seat mounting track.

2. The apparatus as recited in claim 1, wherein said energy dissipating member is a cylindrical tube.

3. The apparatus as recited in claim 2, wherein said cylindrical tube has a predetermined crush-resisting capacity.

4. The apparatus as recited in claim 1, said opening in the aft seat support being shaped for receiving a portion of said energy dissipating member when said plunger crushingly engages end portions of said energy dissipating member.

5. The apparatus as recited in claim 4, wherein said opening is adjacent to a reinforcing flange on said aft seat support for restraining said energy dissipating member in the aft seat support when said plunger crushingly engages end portions of said energy dissipating member.

6. The apparatus as recited in claim 1, with the addition of connectors extending through elongated openings in said aft seat support for slidably mounting said plunger on the aft seat support.

7. The apparatus as recited in claim 6, wherein said elongated openings have generally semicircular upper and lower ends, said generally semicircular upper ends having a larger radius than said generally semicircular lower ends.

8. Apparatus for mounting an aircraft seat to dissipate energy having the form of a tensile force of at least a 16 g-load acting on the seat, the apparatus dissipating the energy in a controlled manner to less than a 9 g-load to maintain continuity between the seat and a seat mounting track connected to a floor, the apparatus comprising:

a seat;

leg assembly having fore and aft located legs connected to the seat mounting track and said leg assembly having fore and aft seat supports movably secured to said seat, said seat support having a web portion and an opening bounded by flange portions;

an energy dissipating member peripherally enclosed and laterally extending through said opening in said web portion of the aft seat support of said leg assembly; and a plunger secured to said seat, said plunger slidably disposed relative to the aft seat support of said leg assembly, said energy dissipating member being positioned between said plunger and said seat leg assembly for enabling said plunger to crushingly engage said energy dissipating member in response to the tensile force.

9. The apparatus as recited in claim 8, wherein said plunger is slidably mounted on the aft seat support.

10. The apparatus as recited in claim 9, with the addition of connectors slidably mounting said plunger on said aft seat support, said connectors extending through elongated openings in said aft seat support.

11. A saddle assembly for securing a vehicle seat to a seat leg having at least one elongated opening and a chamber, said assembly comprising:

a saddle having spaced legs to form a socket therebetween, each of said legs having an aperture extending therethrough;

a pair of slide blocks in said socket, each of said slide blocks having a passage;

a compression member in said chamber and having ends extending from said chamber into said socket adjacent to said slide blocks; and connectors extending through said apertures, said passage and said elongated opening for movably securing said saddle and said slide blocks to said seat leg such that said slide blocks engage said compression member which dissipates energy when an upwardly directed force is applied to said saddle tending to lift the leg.

12. A saddle assembly according to claim 11, said chamber having curved upper and lower surfaces for engaging said compression member and side surfaces spaced from said compression member such that said compression member is free to deform toward said side surfaces.

13. A saddle assembly according to claim 11, said compression member comprising:

a compression tube having an outside diameter of about 0.75 inches and a wall thickness of about 0.065 inches, said tube having a length of about 0.940 inches.

14. A saddle assembly according to claim 11, each of said slide blocks having front and rear faces spaced apart a distance of about 0.370 inches to form an upper face that engages said compression member when an upwardly directed force is applied to said saddle.

15. Apparatus to dissipate energy for reducing tension force for converting 16 g-loading on a seat to less than 9 g-loading applied to a seat mounting track comprising:

a seat;

leg assembly movably secured to said seat and connectable to a seat mounting track;

an energy dissipating member secured between said seat and said leg assembly; and a plunger secured to said seat and movable vertically relative to said leg assembly to engage said energy dissipating member when force tending to separate said seat and said leg assembly is applied by said seat.

16. Apparatus for mounting a vehicle seat having a leg assembly with a fore and aft seat support connected to the vehicle seat and a fore and aft seat leg connected to a vehicle floor, the seat legs and the seat supports integrally formed into a unit such that the apparatus dissipates energy generated from a vehicle crash that forms a tensile force urging the aft seat leg to pull away from and to disengage the aft seat leg from a seat mounting track secured to the vehicle floor, the apparatus comprising:

an energy dissipating member peripherally enclosed and laterally extending through the aft seat support of the leg assembly between the aft seat support and the aft seat leg; and two blocks forming a plunger secured to the vehicle seat, said plunger being slidably disposed about the aft seat support of the leg assembly wherein said energy dissipating member is between said plunger and the seat for enabling said plunger to crushingly engage said energy dissipating member in response to the tensile force, thereby limiting tensile force tending to urge the aft seat leg from the seat mounting track, each of said blocks being opposingly mounted on the aft seat support and each block having a generally trapezoidal shape for focusing energy into said energy dissipating member.

17. Apparatus for mounting an aircraft seat to dissipate energy having the form of a tensile force of at least a 16 g-load acting on the seat, the apparatus dissipating the energy in a controlled manner to less than a 9 g-load to maintain continuity between the seat and a seat mounting track connected to a floor, the apparatus comprising:

a seat;

leg assembly having fore and aft located legs connected to the seat mounting track and said leg assembly having fore and aft seat supports movably secured to said seat, said seat support having a web portion bounded by flange portions;

an energy dissipating member peripherally enclosed and laterally extending through the web portion of the aft seat support of said leg assembly; and two blocks secured to said seat, said blocks being slidably disposed relative to the aft seat support of said leg assembly, said energy dissipating member being positioned between said blocks and said seat for enabling said blocks to crushingly engage said energy dissipating member in response to the tensile force, each of said blocks having a generally trapezoidal shape for focusing energy into said energy dissipating member as said energy dissipating member is crushed.

18. The apparatus as recited in claim 17, wherein said energy dissipating member is a cylindrical compression tube.

19. The apparatus as recited in claim 18, wherein said cylindrical compression tube has a predetermined crush-resisting capacity.

20. The apparatus as recited in claim 17, wherein said energy dissipating member is mounted in an opening formed in said web portion of the aft seat support, said opening having a relief portion for receiving a portion of said energy dissipating member when said plunger crushingly engages said energy dissipating member.

21. The apparatus as recited in claim 20, wherein said opening is adjacent to a reinforcing flange for restraining said energy dissipating member in the aft seat support when said plunger crushingly engages said energy dissipating member.

22. A saddle assembly for securing a vehicle seat to a seat leg having at least one elongated generally vertically extending opening and a generally horizontally extending opening, said assembly comprising:

a saddle having spaced legs, each of said legs having an aperture extending therethrough;

a pair of slide blocks, each of said slide blocks having upper and lower surfaces and inclined side surfaces to form a generally wedge-shaped member having a passage and a flat upper face;

a compression member in said generally horizontally extending opening; and connectors extending through said apertures, said passage and said elongated generally vertically extending opening for movably securing said saddle and said slide blocks to said seat leg such that said compression member dissipates energy when an upwardly directed force is applied to said saddle tending to lift the leg.

23. A saddle assembly for securing a vehicle seat to a seat leg having at least one elongated opening and at least one recess, said assembly comprising:

a cradle;

a pair of plates secured to said cradle, said plates being spaced apart adjacent to opposite ends of said recess for forming a chamber;

a gusset secured for reinforcing said cradle and said plates;

a compression member in said chamber;

a pair of slide blocks, each of said slide blocks having a passage; and at least one connector extending between said plates and through said passages in said slide blocks for movably securing said cradle and said slide blocks to said seat leg such that said compression member dissipates energy when an upwardly directed force is applied to said saddle tending to lift leg.

* * * * *